(12) United States Patent
Martin et al.

(10) Patent No.: US 12,449,914 B2
(45) Date of Patent: Oct. 21, 2025

(54) INTERACTING WITH A SMART DEVICE USING A POINTING CONTROLLER

(71) Applicant: ARKH Litho Holdings, LLC, Dallas, TX (US)

(72) Inventors: Nathaniel James Martin, London (GB); Charles James Bruce, London (GB); Lewis Antony Jones, London (GB)

(73) Assignee: ARKH LITHO HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/641,937

(22) Filed: Apr. 22, 2024

(65) Prior Publication Data

US 2024/0411385 A1 Dec. 12, 2024

Related U.S. Application Data

(63) Continuation of application No. 17/432,028, filed as application No. PCT/IB2020/051292 on Feb. 15, 2020, now Pat. No. 11,989,355.

(Continued)

(51) Int. Cl.
G06F 3/0346 (2013.01)
G06F 3/01 (2006.01)
(Continued)

(52) U.S. Cl.
CPC ............ *G06F 3/0346* (2013.01); *G06F 3/017* (2013.01); *G06F 3/0482* (2013.01); *G06F 3/04847* (2013.01)

(58) Field of Classification Search
CPC ...... G06F 3/0346; G06F 3/048; G06F 3/0482; G06F 3/017; G06F 3/011; G06F 3/04847
See application file for complete search history.

(56) References Cited

U.S. PATENT DOCUMENTS 7,885,145 B2 2/2011 Marti
8,570,273 B1 10/2013 Smith
(Continued)

FOREIGN PATENT DOCUMENTS

JP 2008306288 12/2008
JP 4701424 B2 6/2011
(Continued)

OTHER PUBLICATIONS

International Search Report and Written Opinion issued in App. No. PCT/IB2020/051292, dated May 13, 2020, 12 pages.
(Continued)

*Primary Examiner* — Christopher E Leiby

(74) *Attorney, Agent, or Firm* — Amsel IP Law PLLC; Jason Amsel

(57) ABSTRACT

A pointing controller worn by a user enables intuitive control of various connected smart devices. Users may indicate which device is to be controlled by pointing in the direction of the smart device (or a proxy object) and performing a predefined action to select the device for control. Once selected, the user may interact with the smart device by performing various gestures or interactions with one or more control elements integrated into the pointing controller. The smart device may provide feedback using visual or auditory indicators on the smart device, or by sending a control signal to the pointing controller or other device in proximity to the user that provides haptic, auditory, or visual feedback.

20 Claims, 6 Drawing Sheets

Related U.S. Application Data

(60) Provisional application No. 62/807,094, filed on Feb. 18, 2019.

(51) Int. Cl.
    *G06F 3/0482*           (2013.01)
    *G06F 3/04847*         (2022.01)

(56) References Cited

U.S. PATENT DOCUMENTS

| | | | |
|---|---|---|---|
| 9,229,540 | B2 | 1/2016 | Mandella |
| 10,922,583 | B2 | 2/2021 | Kaehler |
| 11,231,786 | B1 | 1/2022 | Elangovan |
| 11,546,951 | B1 | 1/2023 | Siminoff |
| 2010/0302378 | A1* | 12/2010 | Marks .................. G06F 3/0346 348/169 |
| 2012/0119988 | A1 | 5/2012 | Izumi |
| 2015/0077336 | A1 | 3/2015 | Elangovan |
| 2015/0153822 | A1 | 6/2015 | Kauffmann |
| 2015/0346701 | A1 | 12/2015 | Gordon |
| 2016/0231812 | A1 | 8/2016 | Hansen |
| 2016/0274762 | A1 | 9/2016 | Lopez |
| 2017/0336882 | A1* | 11/2017 | Tome .................. G06F 3/03547 |
| 2018/0018826 | A1 | 1/2018 | Maier |
| 2018/0073889 | A1 | 3/2018 | Ester |
| 2019/0011999 | A1 | 1/2019 | Beach |
| 2019/0034765 | A1 | 1/2019 | Kaehler |
| 2021/0208698 | A1 | 7/2021 | Martin |
| 2022/0013704 | A1 | 1/2022 | Chen |
| 2023/0072423 | A1 | 3/2023 | Osborn |
| 2023/0154123 | A1 | 5/2023 | Xin |

FOREIGN PATENT DOCUMENTS

| | | | |
|---|---|---|---|
| JP | 2014117409 | | 6/2014 |
| JP | 2017168060 | | 9/2017 |
| JP | 2018532168 | A | 11/2018 |
| JP | 2019096119 | A | 6/2019 |
| KR | 20150107597 | A | 9/2015 |
| KR | 20150139235 | A | 12/2015 |
| KR | 20170059300 | A | 5/2017 |
| WO | 2016192916 | A1 | 12/2016 |
| WO | 2018005061 | | 1/2018 |
| WO | 2020170105 | A1 | 8/2020 |

OTHER PUBLICATIONS

Luka Cehovin et al, "Robust Visual Tracking Using an Adaptive Coupled-Layer Visual Model", IEEE Transactions on Pattern Analysis and Machine Intelligence, USA, (Apr. 1, 2013), vol. 35, No. 4, doi:10.1109/TPAMI.2012.145, ISSN 0162-8828, pp. 941-953, XP055690673.

Office Action (Non-Final Rejection) dated Jun. 8, 2023 for U.S. Appl. No. 17/432,028 (pp. 1-36).

Office Action (Notice of Allowance and Fees Due (PTOL-85)) dated Jan. 16, 2024 for U.S. Appl. No. 17/432,028 (pp. 1-8).

Office Action (Notice of Allowance and Fees Due (PTOL-85)) dated Apr. 22, 2024 for U.S. Appl. No. 17/432,028 (pp. 1-3).

Sareh Shirazi et al, "Object tracking via non-Euclidean geometry: A Grassmann approach", IEEE Winter Conference On Applications of Computer Vision, (Mar. 1, 2014), doi:10.1109/WACV.2014.6836008, ISBN 978-1-4799-4985-4, pp. 901-908, XP055690681.

Mncent Spruyt et al, "Robust Arm and Hand Tracking by Unsupervised Context Learning", Sensors, (Jul. 7, 2014), vol. 14, No. 7, doi:10.3390/s140712023, pp. 12023-12058, XP055690670.

Australian Examination Report No. 1 for Standard Patent Application (Application No. 2020226861).

Hwiyong Choi et al., Robust Classification of Hand Posture to Arm Posture Change Using Inertial Measurement Units. The 4th Annual IEEE International Conference on Cyber Technology in Automation, Control and Intelligent Systems (Jun. 7, 2014).

Japanese Office Action mailed Jan. 30, 2024 in Patent Application No. 2021-571059 and English Translation.

Japanese Penultimate Office Action mailed Oct. 24, 2024 in Patent Application No. 2021-571059 and English Translation.

Korean Office Action in Patent Application No. 10-2021-7030557 mailed Dec. 26, 2024 and English Translation.

\* cited by examiner

INTERACTING WITH A SMART DEVICE USING A POINTING CONTROLLER

CROSS-REFERENCE TO RELATED APPLICATIONS

This application is a continuation of U.S. patent application Ser. No. 17/432,028, now U.S. Pat. No. 11,989,355, filed on Aug. 18, 2021 as a National Stage Entry under 35 USC 371 of International Patent Application No. PCT/IB2020/051292 filed on Feb. 15, 2020, which claims the benefit of U.S. Provisional Application No. 62/807,094 filed on Feb. 18, 2019, which are each incorporated by reference herein.

BACKGROUND

Technical Field

This disclosure relates to controlling a smart device, and more specifically, to controlling interactions with the smart device using a pointing controller.

Description of the Related Art

Users conventionally configure smart devices such as thermostats, speakers, and lighting systems through controls on the device itself or through a user interface accessible on a smart phone application or web portal. Accessing these interfaces is not always convenient for the user and can be inefficient. Voice-controlled devices provide an additional level of control but may be undesirable in quiet settings and unreliable in noisy environments.

SUMMARY

A method, non-transitory computer-readable storage medium, and tracking device controls interactions with a smart device using a pointing controller. Sensor data is obtained from a state sensing device of the pointing controller. Movement of a pointing vector is tracked through a three-dimensional space based on the sensor data and a stored arm model. An intersection of the pointing vector with coordinates in the three-dimensional space associated with the smart device is detected to place the smart device in a selected state. An augmented reality display device displays a virtual menu associated with the smart device. A control interaction with the pointing controller associated with the virtual menu is detected when the smart device is in the selected state, and a command is generated to control an operation of the smart device based on the control interaction.

In an embodiment, the coordinates associated with the smart device comprise a physical location of the smart device. In another embodiment, the coordinates associated with the smart device comprise a location of a real or virtual proxy device associated with the smart device.

In an embodiment, detecting the intersection of the pointing vector with the coordinates associated with the smart device comprises generating a pointing cone having a central axis aligned with the pointing vector, and origin proximate to a location of the pointing controller, and a radius that increases with distance from the origin of the pointing vector. The intersection is detected responsive to the pointing cone overlapping with the coordinates associated with the smart device.

In an embodiment, detecting the control interaction comprises detecting activation of an interdigit button of the pointing controller. Furthermore, in an embodiment, detecting the control interaction comprises detecting interaction with a slider control interface of the pointing controller, navigating between different menu items in the virtual menu responsive to the interaction with the slider control interface, and selecting a menu item responsive to detecting of an activation of an interdigit button of the pointing controller. In another embodiment, detecting the control interaction comprises detecting a gesture made with the pointing controller indicative of a control function of the smart device.

In an embodiment, tracking movement of a pointing vector comprises performing tracking based on a camera integrated with the pointing controller.

In an embodiment, tracking the movement of the pointing vector comprises detecting whether the pointing controller is indoors or outdoors, and adjusting parameters of the arm model depending on whether the pointing controller is indoors or outdoors. In another embodiment, tracking the movement of the pointing vector comprises detecting whether a user of the pointing controller is sitting or standing, and adjusting parameters of the arm model depending on whether the user of the pointing controller is sitting or standing. In another embodiment, tracking the movement of the pointing vector comprises detecting a fatigue level associated with a user of the pointing controller, and adjusting parameters of the arm model depending on the detected fatigue level.

In an embodiment, tracking the movement of the pointing vector comprises determining that the coordinates in the three-dimensional space associated with the smart device are greater than a threshold distance from the pointing controller, generating parameters of the arm model corresponding to the arm as being in an outstretched position, and tracking the movement based on the parameters of the arm model.

In an embodiment, tracking the movement of the pointing vector comprises determining that the coordinates in the three-dimensional space associated with the smart device are less than a threshold distance from the pointing controller, generating parameters of the arm model corresponding to the arm as being in a relaxed position near the body, and tracking the movement based on the parameters of the arm model.

In an embodiment, a tracking device recognizes the smart device as a smart light, detects the control interaction with the pointing controller comprises detecting a swiping gesture on a touch interface of the pointing controller, and generates the command comprises controlling a dimming of the light dependent on a direction of the swiping gesture.

Additional embodiments will be apparent to those skilled in the art.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A pointing controller worn by a user enables intuitive control of various connected smart devices. Users may indicate which device is to be controlled by pointing in the direction of the smart device (or a proxy object) and performing a predefined action to select the device for control. Once selected, the user may interact with the smart device by performing various gestures or interactions with one or more control elements integrated into the pointing controller. The smart device may provide feedback using visual or auditory indicators on the smart device, or by sending a control signal to the pointing controller or other device in proximity to the user that provides haptic, auditory, or visual feedback.

Figure 1:
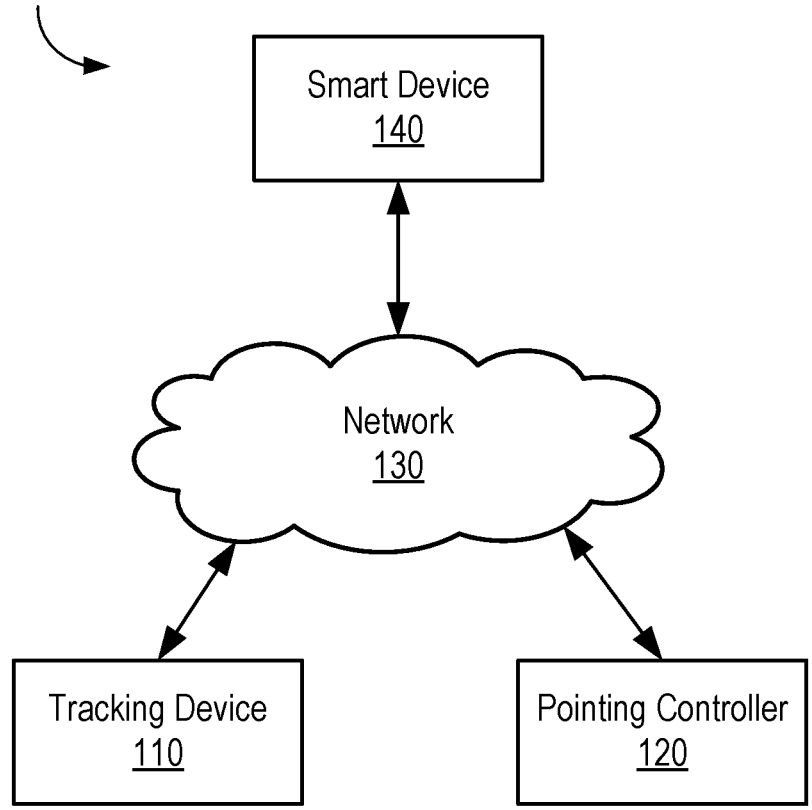
FIG. 1 illustrates an example embodiment of a smart device control system.

FIG. 1 is a block diagram of a smart device control system 100, according to one embodiment. The smart device control system 100 includes a smart device 140, a tracking device 110, and a pointing controller 120 connected via a network 130. In alternative configurations, different and/or additional components may be included in the smart device control system 100.

The smart device 140 comprises a connection-enabled electronic device capable of performing one or more functions based on various configuration settings. Examples of smart devices 140 include, for example, smart thermostats, smart locks, smart refrigerators, smart speakers, smart lighting controllers, smart medical equipment, or other devices. The smart device 140 comprises hardware that generally includes at least a processor, a storage medium, and a communication interface. Additionally, the smart device 140 may include one or more sensors to detect various environmental conditions relevant to its operation. For example, a smart thermostat may include a temperature sensor and humidity sensor. The smart device 140 generally provides one or more control outputs in response to a direct user input, detected environmental conditions, detected events, or a combination thereof. For example, a smart thermostat may control a heating and/or cooling system to control ambient temperature within a desired range. A smart lighting system may control turning on or off or connected bulbs, a color of the light output, or on/off patterns associated with the bulbs. The smart device 140 may execute software or firmware that enables it to provide some level of automated control to intelligently predict the user's desired operation. The smart device 140 may furthermore include an Application Programming Interface (API) that enables other connected devices to provide command inputs to the smart device 140 or to query for status information or other information from the smart device 140. The API may be accessible via an application interface or web interface of another network-connected device such as a smart phone, remote controller, or backend server.

Figure 6:
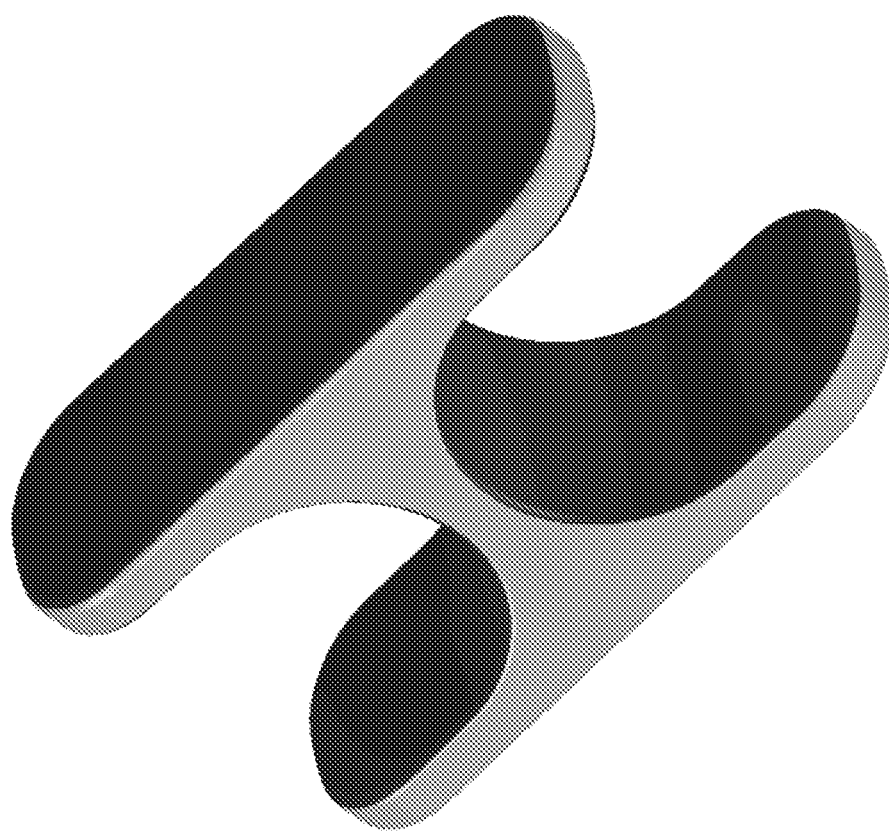
FIG. 6 illustrates an example embodiment of a pointing controller with a form factor for grasping between adjacent fingers.

The pointing controller 120 comprises a control device that captures user gestures and interactions with control elements integrated into the pointing controller 120. In an embodiment, the pointing controller 120 has a form factor enabling it to be worn on a hand, wrist, or arm. For example, in one embodiment, the pointing controller 120 has a form factor that enables it to be grasped between two adjacent fingers, as illustrated in FIG. 6. In other embodiments, the pointing controller 120 may comprise a ring form factor that enables it to be worn on a single finger. In another embodiment, the pointing controller 120 may comprise a knuckle duster that is worn across multiple fingers. In yet other embodiments, the pointing controller 120 comprises a band that can be worn around the wrist or arm.

The pointing controller 120 includes various sensors to enable position and orientation sensing of the pointing controller 120 and control interfaces to receive direct inputs from a user wearing the pointing controller 120. For example, the pointing controller 120 may capture human gestures such as pointing or waving and may capture interactions with control elements on the pointing controller 120. Different gestures may be utilized to provide different control inputs to the smart device 140. Beneficially, the pointing controller 120 enables a user to interact with the smart device 140 in a natural way, as will be described in further detail below.

The tracking device 110 comprises a computing device that operates in conjunction with the pointing controller 120 to process gestures and other interactions detected by the pointing controller 120 and generate the control inputs for controlling the smart device 140. In an embodiment, the tracking device 110 interfaces with the API of the smart device 140 to provide the control inputs. For example, the tracking device 110 may receive position tracking data from sensors of the pointing controller 120 and determine a pointing direction of the pointing controller 120 and/or particular gestures made by the user wearing the pointing controller 120 based on the tracking data. The tracking device 110 may furthermore obtain information about the location of the smart device 140 and/or other objects within an environment of the tracking controller 120. Additionally, the tracking device 110 may receive control data indicative of user interactions with control elements on the pointing controller 120. The tracking device 110 then generates control outputs to control aspects of the smart device 140 based on the detected pointing direction, the locations of the smart device 140 and/or other objects, and the interactions with control elements of the pointing controller 120.

In an embodiment, the tracking device 110 comprises a smart phone, tablet, head mounted display device, or other device executing an application for interfacing with the pointing controller 120 and for interfacing with the smart device 140 including computing devices that do not necessarily include a display. Alternatively, the tracking device 110 may be integrated with the pointing controller 120 in any of the form factors of the pointing controller 120 described above.

In a particular embodiment, the tracking device 110 may include a display system presenting digital content such as audio, images, video, or a combination thereof. Here, the tracking device 110 may comprise an augmented reality display device embodied, for example, as a head-mounted apparatus having an integrated display or a separate display such as a smartphone or tablet. In an augmented reality application, the tracking device 110 enables presentation of information and/or virtual objects together with a viewer's view of the real world. This overlay may be implemented, for example, through a semi-transparent display that enables the user to view the rendered presentation concurrently with a real world view, a projection system that projects virtual objects or information onto the real world view, or a camera feed that captures the real world view, combines it with the overlaid presentation, and presents the combined view to the user via a display.

In an example use case, the pointing controller 120 and tracking device 110 may enable a user to interact with a smart device 140 using motions that are natural and intuitive. For example, the user may point at the smart device 140 and perform a predefined interaction with the pointing controller 120 to activate a function of the smart device 140 such as, for example, turning on a light, setting a thermostat, changing the volume of a speaker, or other function. In other embodiments, the user may control the smart device by pointing to a proxy device, which may comprise a real-world object or a virtual object associated with the smart device 140. Here, for example, a user may point to a radiator associated with a smart thermostat to cause the smart thermostat to control temperature of the radiator. In another example, the user may point to a light bulb associated with a smart switch to cause the smart switch to control operation of the light bulb. In yet other embodiments, virtual objects in an augmented reality display of the tracking controller 110 may serve as proxy devices to control a smart device 140. For example, a user may point to a virtual menu or virtual icons associated with a smart thermostat to control functionality of the smart thermostat.

The network 130 may include any combination of local area and/or wide area networks, using both wired and/or wireless communication systems. In one embodiment, the network 130 uses standard communications technologies and/or protocols and may include one or more of a Bluetooth, a Bluetooth Low Energy, a WiFi Direct, a WiFi, cellular network technologies, or wired communication protocols. The network 130 may encompass different types of connections between different devices. For example, the tracking device 110 may communicate with the pointing controller via a Bluetooth connection and may communicate with the smart device 140 via a WiFi connection. In some embodiments, all or some of the communication links of the network 130 may be encrypted using any suitable technique.

Figure 2:
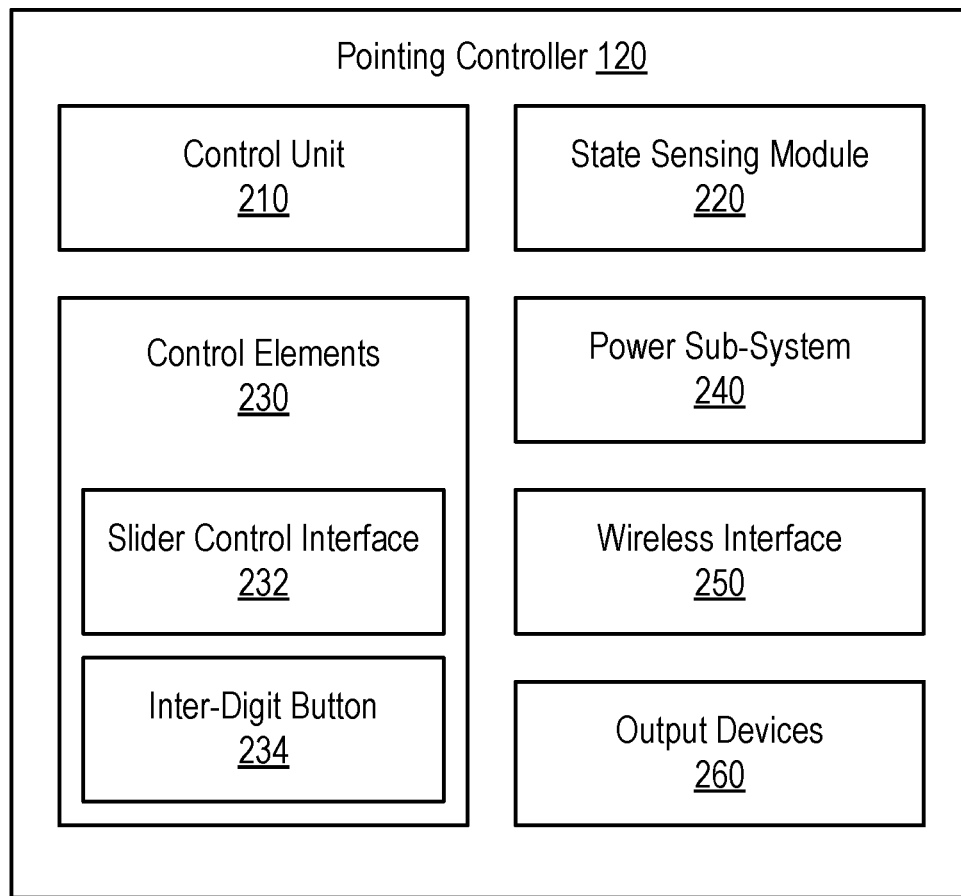
FIG. 2 illustrates an example embodiment of a pointing controller.

FIG. 2 is a block diagram illustrating an example embodiment of a pointing controller 120. In an embodiment, the pointing controller 120 comprises a control unit 210, a state sensing module 220, control elements 230, a power subsystem 240, a wireless interface 250, and output devices 260. In alternative embodiments, the pointing controller 120 comprises additional or different components.

The state sensing module 220 comprises an electronic device for capturing data that enables sensing of a state of the pointing controller, which may include, for example, position, orientation, motion, environmental conditions, or other information about the state of the pointing controller 120. For example, in one embodiment, the state sensing module 220 may comprise a six degree of freedom (6 DOF) inertial measurement unit (IMU) having a gyroscope for sensing orientation or angular velocity and an accelerometer for sensing acceleration. In another embodiment, the state sensing module 220 may comprise a nine degree of freedom (9 DOF) IMU that includes a gyroscope and accelerometer as described above and furthermore includes a magnetometer for detecting a magnetic field (e.g., the magnetic field of the earth). The magnetometer may be utilized as a compass to detect an orientation of the pointing controller 120 relative to the geographic cardinal directions. The IMU may furthermore process data obtained by direct sensing to convert the measurements into other useful data, such as computing a velocity or position from acceleration data.

In another embodiment, the state sensing module 220 may comprise one or more cameras that captures images of the environment suitable for tracking position and orientation of the pointing controller 120 and correcting for any drift that may have accumulated in the IMU data. Here, image data may be processed using a scale-invariant feature transform (SIFT) algorithm and a pre-existing map of the space, using simultaneous localization and mapping (SLAM) techniques, using specifically crafted tracking markers visible by the camera, or using other image-based tracking techniques. A tracking algorithm for deriving the position and orientation of the pointing controller 120 based on the captured images may be performed on the pointing controller 120 itself or the images may be provided to the tracking device 110 for processing in order to reduce power consumption of the pointing controller 120.

In another embodiment, the state sensing module 220 may comprise a radio frequency (RF) transceiver that detects beacons from anchor devices at known positions within the environment or from the tracking device 110. Accurate position within the three-dimensional space can be computed using triangulation techniques based on time-of-flight of various beacon signals or computed from the received signal strength indication (RSSI) from the array of anchor devices.

In another embodiment, the state sensing module 220 may include a Bluetooth directional finding module that obtains a position of the pointing controller 120 relative to the tracking device 110 or other external device (e.g., using an array of antennae in the pointing controller 120, tracking device 110, or both to determine a direction of the radio waves).

In an embodiment, the state sensing module 220 may comprise a barometric sensor that measures atmospheric pressure. A height of the pointing controller 120 may be estimated based on the detected pressure as described in further detail below.

In an embodiment, the state sensing module 220 may utilize Bluetooth directional finding to obtain a position of the pointing controller 120 relative to the tracking device 110 (e.g., using an array of antennae in the pointing controller 120, tracking device 110, or both to determine a direction of the radio waves) as described in further detail below.

In further embodiments, the state sensing module 220 may comprise an ultrasonic pulse transmitter and/or a microphone that may be used to determine an acoustic time of flight representing a distance between the pointing controller 120 and the tracking device 110 or other reference device as described in further detail below.

In another embodiment, the state sensing module 220 may be omitted entirely, and alternative techniques may be used to determine a pointing direction of the pointing controller 120. For example, in place of the state sensing module 220 an infrared (IR) module (not shown) may be included that emits an IR signal detectable by receivers that are integrated with or attached onto (e.g., as stick-on, low-cost, low power devices) the smart device 140 or proxy object.

The control elements 230 include one or more controls for detecting control inputs from a user. The control elements 230 may include, for example, a touch sensor (e.g., a capacitive touch sensor), other sensors or transducers, or physical buttons, dials, switches, or other control mechanisms. In a particular embodiment, the control elements 230 include a slider control interface 232 and an inter-digit button 234. In other embodiments, different or additional control elements 230 may be employed.

The slider control interface 232 comprises a touch-sensitive pad accessible by a user's thumb or other finger. The touch-sensitive pad may comprise an array of sensing elements that detect changes in capacitance or resistance occurring in response to a touch, thereby enabling the touch-sensitive pad to detect the presence or absence of a touch and a location of touch within the area of the pad. In some embodiments, the touch-sensitive pad may additionally include touch force sensors to enable sensing of the force applied by the touch. A user may interact with the slider control interface 232 by performing various gestures such as tapping or swiping with the thumb or other finger. Swiping may be performed in a forward or backward direction along an axis of a finger (e.g., parallel to the pointing direction), along an axis substantially perpendicular to the axis of the finger (e.g., perpendicular to the pointing direction), or in a circular motion in a clockwise or counterclockwise direction. In the form factor of FIG. 6, the slider controller interface 232 may be positioned on a bottom side of the pointing controller 120 on the surface running across the bottom of the index and middle fingers.

The inter-digit button 234 may comprise a touch-sensitive and/or pressure-sensitive pad positioned such that it can be selected by squeezing two fingers together. For example, in the form factor of FIG. 6, the inter-digit button 234 may be on an interior of the curved surface such that it is adjacent to the side of the index finger or the middle finger when the pointing controller 120 is held between the index and middle fingers. In an embodiment, the inter-digit button 234 comprises a force-sensitive resistor that detects a force applied to the touch-sensitive pad. Alternatively, the inter-digit button 234 may operate similarly to the touch-sensitive pad of the slider controller interface 232 discussed above. Due to its placement, the inter-digit button may be used to detect a "pinching gesture" in which the middle finger and the index finger (or other pair of adjacent fingers) are pressed towards each other with at least a threshold pressure applied to the touch-sensitive and/or pressure-sensitive pad of the inter-digit button.

The power sub-system 240 stores and supplies power to the pointing controller 120. For example, the power sub-system 240 may comprise a battery, a charging circuit for charging the battery, one or more voltage regulators to control the voltage supplied to other components of the pointing controller 120. In an embodiment, the power sub-system 240 may control the pointing controller 120 to switch between different power modes (e.g., a full power mode, a low power mode, and a sleep mode) in order to utilize the battery efficiently.

The wireless interface 250 communicates wirelessly with the tracking device 110 via the network 130. In an embodiment, the wireless interface 250 may comprise for example, a Bluetooth interface, a Bluetooth low energy interface, a WiFi link, or other wireless interface. The wireless interface 250 may communicate directly with the tracking device 110 via a peer-to-peer connection or may communicate with the tracking device 110 via one or more intermediate devices over a local area network, a wide area network, or a combination thereof. In an embodiment, the wireless interface 250 may communicate directly with the smart device 140.

The output devices 260 include various devices for providing outputs from the pointing controller 120 in response to control signals from the tracking device 110 or directly in response to actions on the pointing controller 120. The output devices 260 may include, for example, a haptic feedback device (e.g., a linear resonant actuator or eccentric mass vibration motor), one or more light emitting diodes (LEDs), or an audio output device.

The control unit 210 processes inputs from the state sensing module 220, control elements 230, power sub-system 240, and wireless interface 250 to control the various functions of the pointing controller 120. In an embodiment, the control unit 210 comprises a processor and a non-transitory computer-readable storage medium that stores instructions that when executed by the processor causes the processor to carry out the functions attributed to the controller 210 described herein. Alternatively, or in addition, the control unit 210 may comprise digital logic embodied as an application specific integrated circuit (ASIC) or field-programmable gate array (FPGA).

The control unit 210 may process raw data from the state sensing module 220 and control elements 230 to detect motion events or interaction events and then send processed events to the tracking device 110 instead of the raw data, thereby reducing bandwidth over the communication link 130. For example, the control unit 210 may obtain raw accelerometer, gyroscope, and/or magnetometer data from an IMU of the state sensing module 220 and apply a sensor fusion algorithm to determine a detected orientation (e.g., roll, pitch, and yaw values). Furthermore, the control unit 210 may process raw touch data (e.g., capacitive or resistive sensing) and perform processing such as analog-to-digital conversion and filtering to generate touch detect events indicating detection of a touch and a position or force of the touch which are sent to the tracking device 110.

Alternatively, the control unit 210 may send only raw data from the state sensing module 220 and control elements 230 to the tracking device 110 and the above-described processing may instead be performed on the tracking device 110. In another embodiment, the control unit 210 may send both raw and processed event data to the tracking device 110.

In an embodiment, the other components of the pointing controller 120 may be coupled with the control unit 210 via a data bus such as a serial peripheral interface (SPI) bus, a parallel bus, or an I2C bus. Furthermore, the components of the pointing controller 120 may generate interrupt signals detectable by the control unit to enable low latency responses to user inputs.

Figure 3:
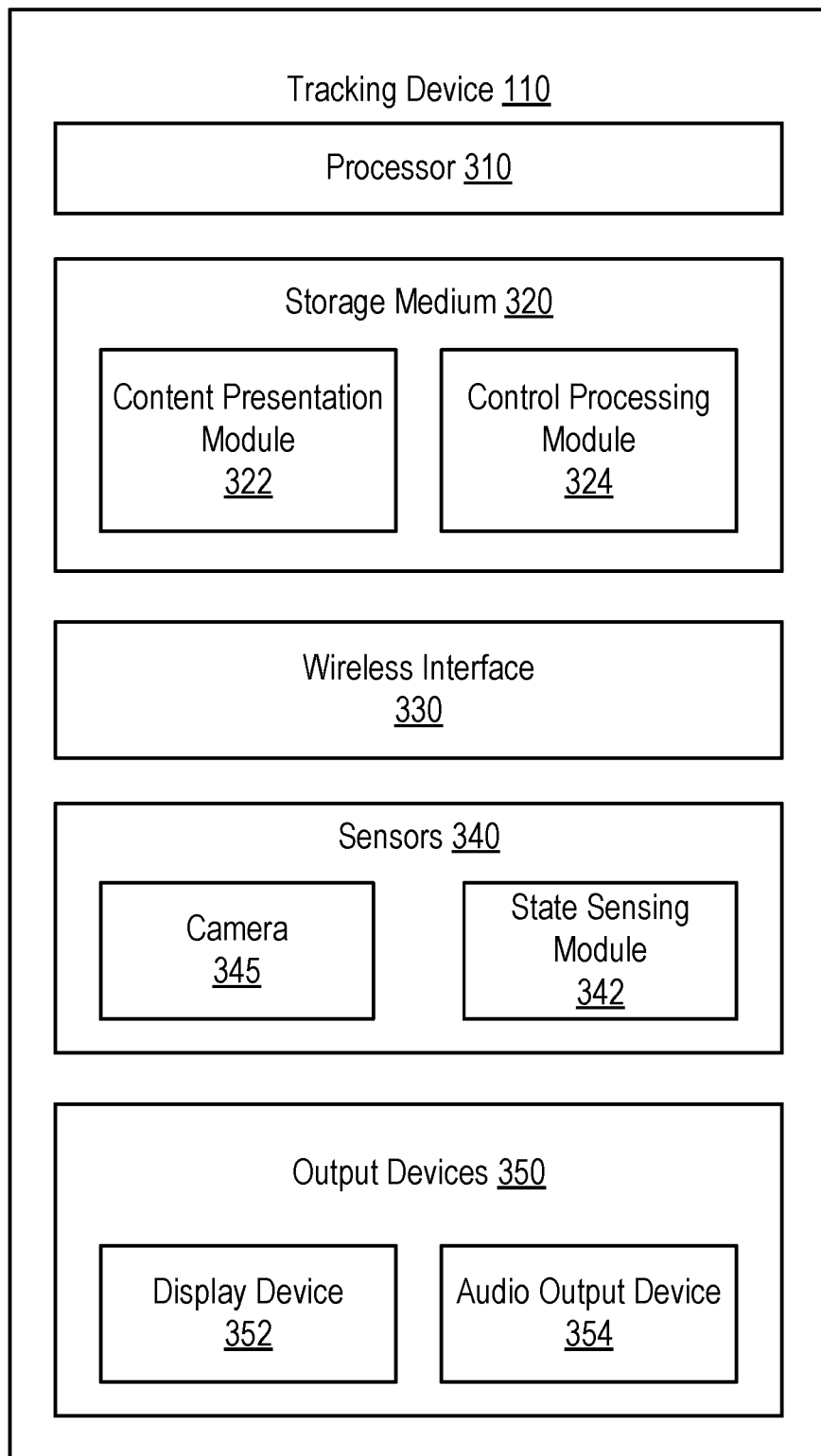
FIG. 3 illustrates an example embodiment of a tracking device.

FIG. 3 is a block diagram illustrating an embodiment of a tracking device 110. In the illustrated embodiment, the tracking device 110 comprises a processor 310, a storage medium 320, a wireless interface 330, sensors 340 including a camera 345 and state sensing module 342, and output devices 350 including a display 352 and an audio output device 354. Alternative embodiments may include additional or different components. For example, in some embodiments, a tracking device 110 without display capabilities does not necessarily include a display, camera 345, or content presentation module 322.

The wireless interface 330 communicates wirelessly with the pointing controller 120 via the network 130. In an embodiment, the wireless interface 330 may comprise for example, a Bluetooth interface, a WiFi interface, or both. The wireless interface 330 may communicate directly with the pointing controller 120 via a peer-to-peer connection or may communicate with the pointing controller 120 via one or more intermediate devices over a local area network, a wide area network, or a combination thereof. The wireless interface 330 may furthermore communicate with smart device 140 via the network 130.

In an embodiment, the wireless interface 330 may receive transmit information and commands to the pointing controller 120 to perform actions such as controlling the pointing controller 120 to enter various power modes; requesting detailed information about the status of the pointing controller 120 such as battery status, temperature, or other diagnostic information; updating the firmware of the pointing controller 120; activating a haptic actuator on the pointing controller 120 according to a specific vibration pattern; or configuring the haptic actuator on the pointing controller 120 to respond directly to events detected on the pointing controller 120, such as activating a particular button or control input on the pointing controller 120. The wireless interface 330 may furthermore periodically receive transmissions from the pointing controller 120 that include information such as tracking data from the state sensing module 220 of the pointing controller 120, control data from the control elements 230 of the pointing controller 120, or battery information from the power sub-system 240 of the pointing controller 120.

The sensors 340 detect various conditions associated with the operating environment of the tracking device 110. For example, a camera 345 captures real-time video of the real-world environment within the view of the tracking device 110. Image data from the camera may be combined with virtual objects or information to present an augmented reality view of the world. The camera 345 may include a conventional image camera, a non-visual camera such as a depth camera or LIDAR camera, or a combination thereof.

The sensors 340 may also include a state sensing module 342 to sense movement and orientation of the tracking device 110. The state sensing module 342 may include similar components and may operate similarly to the state sensing module 220 of the pointing controller 120 discussed above. For example, the state sensing module 342 may include one or more of an IMU, a radio frequency (RF) transceiver, a Bluetooth directional finding module, a barometric sensor, an ultrasonic pulse transmitter and/or a microphone, or other sensors.

The sensors 340 may optionally include other sensors for detecting various conditions such as, for example, a location sensor (e.g., a global positioning system) or a temperature sensor.

The output devices 350 include various devices for providing outputs from the tracking device 110 for presenting the digital content. In an embodiment, the output devices 350 may include at least a display 352 and an audio output device 354. In alternative embodiments, the output devices 350 may include additional output devices for providing feedback to the user such as, for example, a haptic feedback device and one or more light emitting diodes (LEDs). The audio output device 354 may include one or more integrated speakers or a port for connecting one or more external speakers to play audio associated with the presented digital content. The display device 352 comprises an electronic device for presenting images or video content such as an LED display panel, an LCD display panel, or other type of display. The display device 352 may be configured in a manner to present the digital content in an immersive way to present a simulation of a virtual or augmented reality environment. For example, the display device 352 may comprise a stereoscopic display that presents different images to the left eye and right eye to create the appearance of a three-dimensional environment. In an embodiment, the display device 352 may present digital content that combines rendered graphics depicting virtual objects and/or environments with content captured from a camera 345 to enable an augmented reality presentation with virtual objects overlaid on a real world scene.

The storage medium 320 (e.g., a non-transitory computer-readable storage medium) stores instructions executable by the processor 310 for carrying out functions attributed to the tracking device 110 described herein. In an embodiment, the storage medium 320 includes a content presentation module 322 and a control processing module 324. In alternative embodiments, the storage medium 320 may include additional or different modules.

The content presentation module 322 presents digital content via the display 352 and/or the audio output device 354. The displayed content may comprise a virtual reality or augmented reality environment in a three-dimensional space. The displayed content may include virtual objects which may be combined with real-world images captured by the camera 345. The content presentation module 322 may adapt its content based on information received from the control processing module 324.

The control processing module 324 processes inputs received from the pointing controller 120 via the wireless interface 330 and generates processed input data that may generate control commands for a smart device 140 and/or may control output of the content presentation module 322. For example, the control processing module 324 may track the position of the pointing controller 120 within the virtual environment displayed by the content presentation module 322 based on the received tracking data from the state sensing modules 220, 342. Furthermore, the control processing module 324 may process inputs from the control elements 230 to detect gestures performed with respect to the control elements 230. The control processing module 324 may determine commands for outputting to the smart device 140 based on the detected tracking of the pointing controller 120 and the detected gestures, and/or may cause the content presentation module 322 to update the presentation in response to the actions. An example of a control processing module 324 is described in further detail below.

Figure 4:
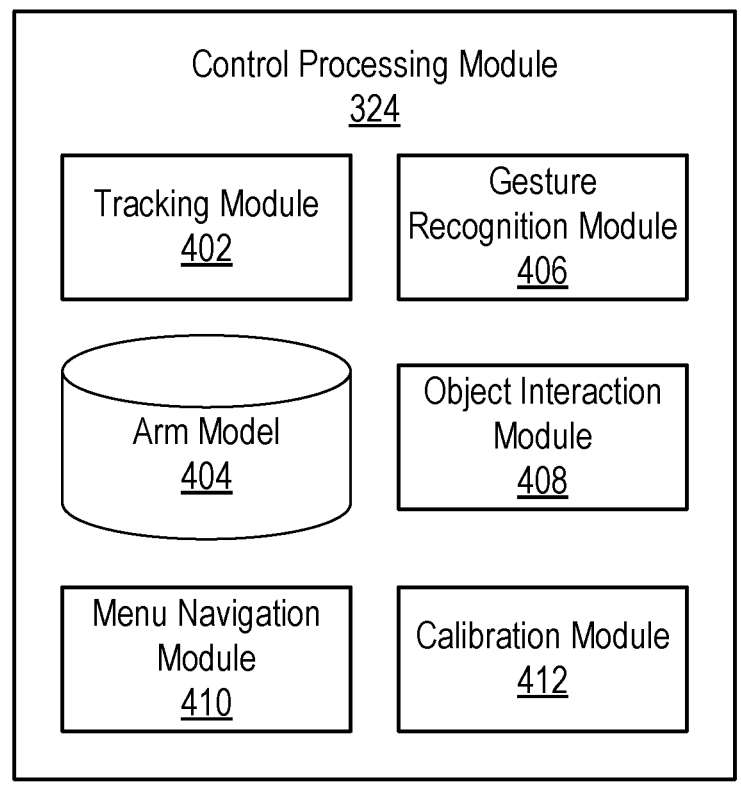
FIG. 4 illustrates an example embodiment of a control processing module for processing interactions from a pointing controller.

FIG. 4 illustrates an example embodiment of a control processing module 324. The control processing module 324 comprises a tracking module 402, an arm model 404, a gesture recognition module 406, an object interaction module 408, a menu navigation module 410, and a calibration module 412. Alternative embodiments may include different or additional modules.

The tracking module 402 infers the position and orientation of the pointing controller 120 relative to the user's head. In an embodiment in which the tracking device 110 is integrated into a head-mounted display, the position of the player's head can be directly inferred from the position of the tracking device 110 because the tracking device 110 is fixed relative to the head position. Particularly, the tracking module 402 determines an orientation of the pointing controller 120 based on tracking data from the state sensing module 220 and obtains position and orientation for the tracking device 110 relative to the environment based on sensor data from the tracking device 110 (e.g., tracking data from the state sensing module 342). The tracking module 402 then estimates the position of the pointing controller 120 relative to the environment based on the orientation of the pointing controller 120, the position and orientation of the tracking device 110, and an arm model 404 that models the pose of the user operating the pointing controller 120.

Based on the orientation and calculated position of the pointing controller 120, the tracking module 402 generates and continuously updates a pointing vector originating at the position of the pointing controller 120 and extending in a direction corresponding to the detected orientation. In the case of a pointing controller 120 worn on one or more fingers, the pointing vector may extend along a central axis through the pointing controller 120 aligned with the fingers. The pointing vector may be specified according to three-dimensional coordinates in a virtual environment tracked by the tracking device 110. Thus, the pointing vector provides a pointing direction with respect to the scene in the virtual environment. The pointing vector may comprise, for example, a pair of angles including a first angle relative to a ground plane (i.e., a pitch angle) and a second angle relative to a vertical plane perpendicular to the ground plane (i.e. a yaw angle). In an embodiment, an orientation angle about the axis of the pointing vector (i.e., a roll angle) may also be tracked together with the pointing vector.

In an embodiment, the tracking module 402 may calculate a pointing cone around the pointing vector. Here, the cone originates at the pointing controller 120, has a central axis aligned with the pointing vector, and has a diameter that increases with distance from the pointing controller 120. The cone angle may be adjustable by the user, or developer, or may be a hardcoded parameter. Additionally, the cone angle may be automatically updated based on the context of a detected interaction with an object. For example, when interacting with an environment with a large number of objects close together, the cone angle may be automatically reduced relative to an environment with a small number of objects that are far apart. The tracking module 402 updates the pointing vector, the point cone, and the orientation angle as the user moves the pointing controller 120.

In an embodiment, the tracking module 402 performs tracking based at least in part on IMU data from the state sensing module 220 of the pointing controller 120.

In an embodiment, the tracking module 402 may perform tracking based at least in part on atmospheric pressure data from a barometric sensor of the state sensing module 220 and/or the tracking device 110. For single-ended sensing, a reference pressure value may be determined corresponding to a baseline height during a calibration process. The tracking module 402 may subsequently obtains atmospheric pressure readings and compute vertical offset from the baseline height based on the change in pressure. In another embodiment, the tracking module 402 estimates the vertical position of the pointing controller 120 using differential sensing. In this embodiment, differential pressure is computed between the atmospheric pressure measurement obtained from the pressure sensor of the pointing controller 120 and an atmospheric pressure measurement obtained from a pressure sensor in an external tracking device 110. Differential sensor measurements may be filtered to compensate for natural atmospheric variations due to weather or other factors.

In another embodiment, the tracking module 402 may tracking the pointing controller 120 based in part on the relative RSSIs of wireless signals received at both the pointing controller 120 and the tracking device 110. The relative RSSIs may be used to estimate the distance between the tracking device 110 and the pointing controller 120. The distance estimation may furthermore be improved by modelling the emission and sensitivity patterns of the antennae in the pointing controller 120 and the tracking device 110 (or between multiple devices such as the pointing controller 120 an AR headset, and a mobile phone).

In another embodiment, the tracking module 402 may utilize Bluetooth directional finding data to obtain a position of the pointing controller 120 relative to the tracking device 110 (e.g., using an array of antennae in the pointing controller 120, tracking device 110, or both to determine a direction of the radio waves). In one embodiment, roll and pitch components of the pointing direction are obtained from an integrated IMU and yaw direction is obtained from Bluetooth directional finding. In another embodiment, roll, pitch, and yaw may be obtained from other components of the pointing controller 120 and Bluetooth directional finding may be used to perform correction if there is a discrepancy between other measurements. In another embodiment, statistical error properties may be determined (e.g., if the error is consistent in some relative orientations) and determine information about the relative orientations based on the statistical error properties. In yet another embodiment, Bluetooth directional finding may be utilized to determine multiple points on a rigid body (e.g., from two or more antenna arrays within the AR viewer) and could additionally estimate the distance between the pointing controller 120 and the tracking device 110 without necessarily relying on RSSI.

In further embodiments, the tracking module 402 may performing tracking based on acoustic time of flight representing distance between an ultrasonic pulse transmitter and microphone in the pointing controller 120 and the tracking device 110. In an embodiment, the tracking module 402 utilizes the estimated distance from the acoustic time of flight in the tracking computing only when the detected distance is less than a maximum threshold distance (e.g., 1.5 meters). In another embodiment, a doppler shift effect may be detected to estimate a velocity of the pointing controller 120 relative to the tracking device 110. Here, the velocity estimate may be utilized to compensate for error in a velocity estimate determined from the IMU data using dead reckoning. In another embodiment, the estimated distance based on acoustic time of flight may be adjusted based on barometric data to compensate for the variation in the speed of sound due to pressure differences.

Parameters of the arm model 404 may be determined in an initialization process and may be updated during tracking as will be described below. Input parameters of the arm model 404 may include, for example, a height of the user, a standardized model of human proportions, a joint angle model, and various operating conditions that may change over time. The height of the user may be obtained manually from the user during the initialization process in response to a user prompt requesting the user to enter the height. Alternatively, the height may be automatically estimated based on an estimated position of the tracking device 110 relative to the ground. For example, a visual analysis may be performed on image data captured by the camera 345 of the tracking device 110 to estimate the height. Based on the user's height, the tracking module 402 may perform a lookup in a pre-populated lookup table that maps the height to the size of the hand, forearm, arm, shoulder, and neck based on the standardized model of human proportions. Then, using the combined dimensions of the human body model and the detected orientation of the pointing controller 120, the tracking module 402 can apply the joint angle model to predict relative probabilities of various arm poses. The most probable pose may be selected and the tracking module 402 may estimate the position of the pointing controller 120 relative to the tracking device 110 from the pose.

In an embodiment, additional information derived by the tracking module 402 can be incorporated to more accurately predict the user's pose and eliminate undesirable results. For example, if the most likely predicted pose generated by the joint angle model predicts the user's arm intersecting with a known location of a detected real-world object (an impossible result), the tracking module 402 may instead select the next most probable prediction which does not predict the arm intersecting with a detected object.

In another embodiment, the tracking module 402 may utilize information about the user's current location and/or movement history to improve the accuracy of the tracking by applying different parameters of the arm model 404 in different contexts. For example, because people tend to use more expansive gestures when outdoors than when indoors, the tracking module 402 may adjust the parameters of the arm model 404 depending on whether the user is indoors or outdoors. The tracking module 402 may detect whether the user is indoors or outdoors based on image analysis of captured images or other sensor data. In one technique, the tracking module 402 may determine whether the user is indoors or outdoors based on the presence or absence of a ceiling plane within a certain distance of the user (e.g., not more than 5 meters above the user), which may be detected based on image analysis from captured images or from other sensors. In another embodiment, the tracking module 402 may measure the number of planar surfaces within a specified distance of the tracking device 110 and determine that the user is indoors if the number exceeds a predefined threshold, and determine that the user is outdoors if the number does not exceed the threshold. In yet another embodiment, a location sensor (e.g., a global-positioning system device) may be used to determine the geographic location of the tracking device 110. Then, utilizing map data from a maps service, the tracking module 402 may determine that the user is indoors if the location coincides with a building or otherwise determine that the user is outdoors. In yet another embodiment, a wireless signal strength of a wireless signal received by the tracking device 110 from a remote source (e.g., a GPS signal or cellular data signal) may be used to determine whether the user is indoors or outdoors. For example, when the wireless signal strength is above a predefined threshold, the tracking module 402 determines that the user is outdoors and when the wireless signal strength is below the threshold, the tracking module 402 determines that the user is indoors. In yet another embodiment, the tracking module 402 may perform an analysis of the brightness and/or wavelengths of local light sources detected by the camera 345 to detect whether the user is indoors or outdoors. For example, high brightness lights around the color temperature of sunlight indicates that the user is likely to be outdoors, while color temperatures consistent with light bulbs are indicative of the user being indoors.

In another embodiment, the parameters of the arm model 404 may be adapted based on whether the user is sitting or standing. Here, the tracking module 402 may determine if the user is sitting or standing by detecting the height of the tracking device 110 relative to the ground as described above and detecting whether the height is significantly below the user's standing height (e.g., above a threshold difference).

In an embodiment, the tracking module 402 may furthermore estimate a fatigue level of the user to better predict a position of the pointing controller 120. Here, the tracking module 402 may model a fatigue level by tracking an amount of time a user spends with their wrist about a certain threshold height with the level of fatigue increasing with time. Because a user may prefer to keep the arm lower as fatigue increases, the parameters of the arm model 404 may cause the tracking module 402 to adjust the detected position downward as the predicted fatigue level increases. In an embodiment, the tracking module 402 may apply a machine-learning approach to model the fatigue characteristics of a particular user.

In an embodiment, the tracking module 402 may utilize image data from the camera 345 to sense the position of the pointing controller 120, hand, forearm, or arm. The tracking module 402 may utilize the sensed position to re-calibrate the orientation and position of the pointing controller 120 relative to the tracking device 110 to account for accumulated drift in the tracking data as described in further detail below. Furthermore, the tracking module 402 may apply the sensed position from the image data to improve the accuracy of the arm model 404 by updating estimated parameters such as lengths of the arm or the predicted joint angles. The position of the arm may furthermore be estimated from integration of successive acceleration values from an accelerometer of the state sensing module 220.

In an embodiment, the tracking module 402 may furthermore utilize positional information about the virtual objects (or real-world objects at known locations) to infer the position of the pointing controller 120. For example, if an object is close by (e.g., less than a threshold distance), it may be inferred that the hand is in a relaxed position close to the body. On the other hand, if the object is far away (e.g., greater than a threshold distance), it may be inferred that the hand is in an outstretched position. The tracking module 402 may adjust parameters of the arm model 404 based on the inferred arm position.

In cases where the tracking device 110 is not head-mounted (e.g., the tracking device 110 is embodied as a handheld smart phone or tablet), the position of the user's head may be unknown relative to the tracked position of the tracking device 110. In this case, a calibration technique may be applied to estimate the position of the user's head relative to the position of the tracking device 110. For example, in one embodiment, a user interface on the tracking device 110 prompts the user to touch the tracking device 110 to the user's nose during a calibration phase of an application. Alternatively, a camera of the tracking device 110 may capture images of the user's face and a face tracking algorithm may be applied to detect a central point of the face as corresponding to the initial head position. In yet another embodiment, the vertical component of the head position can be obtained manually by prompting the user to enter his or her height, or the user's height may be obtained from a linked health-tracking application or online service accessible by the tracking device 110.

Once calibrated, the tracking module 402 estimates the vertical component of the head position to be fixed in the three-dimensional space and vertical motion of the tracking device 110 may be tracked in the three-dimensional space relative to this position. Alternatively, a camera 345 of the tracking device 110 may capture images that are processed to detect changes in terrain height. The user's estimated head position may be updated based on the detected changes in terrain height to be at an approximately fixed vertical position above the ground.

In the horizontal plane, the tracking module 402 may estimate the head position to be a fixed horizontal offset from the tracked position of the tracking device 110. Thus, as the tracking device 110 moves and rotates in the horizontal plane, the head position is estimated at a fixed horizontal distance from the tracked position of the tracking device 110.

A re-calibration may be performed if the user changes from a sitting position to a standing position or vice versa. This change may be indicated manually by the user or may be automatically detected when an appropriate shift in the vertical position of the tracking device 110 (and/or the pointing controller 120) is detected. For example, a camera 345 of the tracking device 110 may capture images that may be processed to detect the height of the tracking device 110 relative to the ground and may be used to detect when the user sits down or stands up.

In an alternative embodiment, the user's head position may be assumed to be completely fixed. Here, instead of estimating the head position in the horizontal plane to track the horizontal motion of the tracking device 110 at a fixed offset, the head position may instead be estimated to stay at both a fixed vertical and horizontal position in the three-dimensional space without tracking the motion of the tracking device 110.

In yet another embodiment, a hybrid model may be used that combines the above-described techniques. Here, the initial head location relative to the tracking device 110 is first calibrated using the calibration technique described above (e.g., by prompting the user to touch the display device to the user's nose). The tracking module 402 may initially be set to a "stationary" mode in which it estimates the head position to be maintained at a fixed position in three-dimensional space. Position of the tracking device 110 is tracked using the state sensing module 342 as it moves through the three-dimensional space and a distance between the tracking device 110 and the fixed estimated head position is computed. When the distance between the estimated head location and the tracking device 110 exceeds a predefined activation radius (e.g., approximately equal to an estimated length of the user's fully extended arm), the tracking module 402 switches to a "walking" mode. In the "walking" mode, the head position is instead estimated to be a fixed distance behind the detected position of the tracking device 110. When the tracking device 110 detects that its motion drops below a threshold speed and remains below the threshold speed for a threshold time period, the tracking module 402 switches back to the "stationary mode" in which the estimated position of the head becomes fixed and is no longer updated based on the position of the tracking device 110.

Alternatively, when in the "walking mode," the head position relative to the tracking device 110 may instead be estimated using a mass-spring or mass-spring-damper model. In this embodiment, the estimated distance of the head behind the detected position of the display tracking 110 may vary over time but stabilizes to a fixed position when the tracking device 110 is stable for an extended time period. When the tracking device 110 detects that the distance between the smartphone and the head drops below a deactivation radius in this embodiment, the tracking module 402 switches back to the "stationary" mode.

The gesture recognition module 406 detects gestures made by the user with the pointing controller 120. Examples of gestures may include, for example, moving the pointing controller 120 in a predefined motion or interacting with the slider control interface 232 and/or the inter-digit button in a particular manner (e.g., single tapping, double tapping, maintaining prolonged contact, or a combination of interactions in a particular pattern). Here, the pinching gesture may be detected when the user squeezes the middle finger and index finger together (or other fingers in contract with the pointing controller 120), thereby causing one or more fingers to be placed in contact with the inter-digit button 234 on the pointing controller 120 with at least a threshold amount of pressure for at least a threshold time period. The pinching gesture may be released by separating the fingers or relieving the applied pressure. In some embodiments, the gesture recognition module 406 may capture a force or a time period of the pinching gesture and may take different actions depending on these captured parameters. The swiping gesture may be detected when the user performs a swiping motion on the slider controller interface 232. This gesture may typically be performed with the thumb (or other finger) on the hand wearing the pointing controller 120 but could alternatively be performed by a finger on the opposite hand. Here, the swiping gesture may comprise a linear swiping gesture along a line parallel to the one or more fingers holding the pointing controller 120 in either direction or along a line approximately perpendicular to the one or more fingers in either direction. Alternatively, the swiping gesture may comprise a radial swiping gesture performed in a clockwise or counterclockwise direction about a reference point in a plane of the slider controller interface 232. In some embodiments, the gesture recognition module 408 may capture a force, a velocity, or a distance of the swiping gesture and take different actions depending on these captured parameters. Other types of gestures may also be recognized to perform various tasks.

The object interaction module 408 determines when the pointing vector or cone intersect an object, which may correspond to the smart device 140, a different real world object at a known location, or a virtual object in a scene being displayed on a display of the tracking device 110. For example, the object interaction module 408 stores coordinates representing the locations occupied by real world and virtual objects and detects when the pointing vector or cone intersects coordinates occupied by one of the objects. In the case that the pointing vector or cone intersects multiple objects, the object interaction module 406 may default to selecting the object closest to the pointing controller 120. In another embodiment, the tracking module 402 may intelligently predict whether the user is intending to point to a near object (e.g., less than 5 meters away) or a far object (e.g., greater than 5 meters away) when the pointing vector intersects multiple objects. For example, the tracking module 402 may infer that the user is intending to point to a far object when the arm is detected to be substantially aligned with the user's eyes and the arm is fully extended. The tracking module 402 may infer that the user is intending to point to a close object when the arm is bent and held at a position below eye level.

In an embodiment, a visual indicator (e.g., a visual out glow or halo effect, a shaded outline, a bounding box, or similar) is displayed in an augmented reality display in association with an object that is being pointed at. Optionally, detailed information about the selected object may also be displayed such as, for example, an object identifier, distance from the pointing controller 120 to the selected object, a status of the object, etc. Furthermore, when an object is pointed at, the object interaction module 406 may cause a haptic motor of the pointing controller 120 to vibrate to provide physical feedback of the action. Alternatively, other visual or audio feedback may be provided to indicate when an object is selected.

The object interaction module 408 may determine commands associated with gestures or control interactions performed when a user is pointing to a particular object. For example, the object interaction module 408 may detect a confirmatory interaction (e.g., a pinching gesture that activates the inter-digit button 234) when the user is pointing at an object. Here, if the object interaction module 408 may confirm selection of a smart device 140 when the interaction is performed when the smart device 140 or a proxy object associated with the smart device 140 is selected based on the pointing vector or cone. Upon confirming selection, the object interaction module 408 may establish a connection to the smart device 140 via the network 130. The object interaction module 408 may then detect gestures or selection of control elements performed by the user to control various functions of the smart device 140. Here, a set of predefined gestures may be associated with different control functions of the smart device 140. The mapping of gestures to their functions may be configured in an intuitive way to enable natural control of the smart device 140. For example, to control a smart thermostat, a user may point or move the hand upwards, turn the hand in a clockwise direction, or pitch the hand upward to raise the temperature and point or move the hand downwards, turn the hand in a counterclockwise direction, or pitch the hand downward to lower the temperature. Alternatively, the slider control interface 232 on the pointing controller 120 may control the temperature based on the direction of the swipe.

In another example interaction, a user may perform gestures to control a smart light dimmer to increase or decrease the light output intensity or change the color temperature of the bulb. For example, the tracking device 110 may detect when the pointing controller 120 is pointing at a light. The pointing controller 120 triggers a haptic, audible, or visual feedback signal when the pointing vector intersects the position of the light, indicating that the light is selected. The pointing controller 120 may detect when the user holds a thumb on the slider controller interface 232 and drags the thumb in one direction to increase brightness of the light and drags the thumb in the opposite direction to decrease the brightness. Releasing the thumb may cause the brightness to stop changing and moving the pointing vector in a direction away from the light may cause the light to become deselected such that further interactions with the control elements 230 no longer generate control signals for the light.

In an embodiment, a deselection action may be performed to deselect a selected smart device 140. In an embodiment, deselection may be performed by pointing away from the smart device 140 or associated proxy object. In an embodiment, haptic or other feedback may be outputted to confirm that the interactions are complete.

The menu navigation module 410 generates a menu presented on the display device 352 in response to a smart device 140 or associated proxy object being selected or another action or combination of actions such as, for example, the slider control interface being tapped while the object is selected. The menu may allow a user to view and/or modify advanced configuration settings associated with a smart device 140. In an embodiment, a wheel or slider interface may be displayed to allow a user to quickly modify parameters using a swiping gesture.

The calibration module 412 performs a calibration process to calibrate the pointing controller 120 in order to initialize the relative position and orientation of the pointing controller 120 to a position and orientation in the virtual environment presented by the content presentation module 362. The roll and pitch of the pointing controller 120 can be detected from the state sensing module 220 with the detected direction of gravity (as sensed by the state sensing module 220) mapped to a downward direction along the vertical axis of the virtual environment. The horizontal direction (yaw) of the pointing controller 120 can be sensed relative to a reference direction during calibration using a variety of techniques. This reference direction may be aligned with the forward looking direction of the tracking device 110 during the calibration process.

In one embodiment, a magnetometer in the state sensing module 220 of the pointing controller 120 may operate as a compass to detect magnetic North. A magnetometer in the tracking device 110 may similarly detect magnetic North and the calibration module 412 may perform a calibration to align these reference directions.

In another embodiment, a location and orientation of the pointing controller 120 can be detected based on an image (visual or depth) analysis performed on one or more images captured by a camera of the tracking device 110 or other external cameras. The calibration module 412 may then perform a calibration using the detected tracking data and the determined location and position from the image data.

In another embodiment, the calibration module 412 performs the calibration by directing a user to point directly ahead and then perform a specific gesture (e.g., a double tap on the slider control interface 232 while also pressing the inter-digit button 234). Unintentional actions may be rejected by ignoring this gesture when the pointing controller 120 is not approximately horizontal, as detected by the state sensing module 220, when the gesture is detected. The calibration module 412 may then set the direction as a reference direction mapped to the straight ahead direction in the virtual environment.

In another embodiment, the calibration may be performed by directing the user to point to a small number of real world objects at locations that are known or can be detected from images captured by the image processing device. Here, in order to determine when a user is pointing at a target, the pitch of the pointing controller 120 should approximately match the pitch vector to the target and additionally the pointing controller 120 should be held approximately still. The calibration module 412 may then perform a calibration using the known positions of these objects in the virtual environment. In an embodiment, this calibration stage could be performed as part of a user tutorial to train the user how to use the pointing controller 120 to interact with objects.

In yet other embodiments that do not rely on the state sensing module 220 of the pointing controller 120 (e.g., embodiments using IR-based detection of pointing direction), the calibration module 412 may be omitted.

In one particular embodiment, the tracking device 110 is configured to display a target object located far away (to minimize perspective error), and a prompt is displayed to direct the user to point at the target object. The calibration module 412 detects when the pointing controller 120 is approximately stationary (e.g., by detecting that the angular rotation rate is below a pre-determined threshold value), and determines that the current pointing direction to be the direction of the target object. In an embodiment, the tracking device 110 may provide a visual indicator to guide the user through the calibration. For example, after the tracking device 110 may display a visual indicator that starts to "fill up" (e.g., a progress bar animation, change in size of the visual indicator, etc.) when the pointing controller 120 has been stationary for a short period of time, and additionally the pitch of the pointing controller 120 approximately matches the pitch of the target relative to the user. During this time, the calibration module 412 records the detected orientation of the pointing controller 120 and determines the difference in yaw (heading) of the pointing controller 120 relative to the yaw of the tracking device 110. If the user moves the pointing controller 120 during the calibration period or the pitch falls outside of an accepted range, the progress is reset. Once the calibration process is complete, the target object may be dismissed from the display and the calibration value is stored. The above-described calibration process can be repeated multiple times with target objects at different yaws (headings) and/or pitches, to improve the accuracy. The calibration process can additionally be performed with target objects at different depths, or by instructing the user to remain facing in one direction but placing targets at the periphery of their vision, to improve the calibration.

In another embodiment, the tracking device 110 may display an outline of an image of the pointing controller 120 and direct the user to place the tracking device 110 on a flat horizontal surface, and then place the pointing controller 120 on the display screen of the tracking device 110 aligned with the outline of the image. The calibration module 412 detects when the pitch of the pointing controller 120 is below a threshold angle and when both the tracking device 110 and the pointing controller 120 are held still for a threshold time period. When these conditions are detected, the calibration module 412 stores the difference between the detected yaw of the pointing controller 120 and the tracking device 110 as a calibration offset. In operation, this calibration offset is subtracted from yaw measurements of the pointing controller 120.

Once calibrated, the calibration module 412 may enable the user to verify the calibration by displaying a test target and enabling the user to ensure that calibration has been performed correctly. In another embodiment, the calibration module 412 may perform continuous auto-calibration during use. The calibration module 412 may store a set of focal points associated with different types of objects. Here, the focal point of an object represents a point on an object of a given object type that a user is likely to have a preference for pointing at when the user attempts to point at that object type. For simple shapes, the focal point may be calculated by computing the center of mass of the object assuming uniform density. For complex shapes, the focal point may be calculated by computing to the center of mass of the convex hull that "wraps" the shape. For other types of functional objects, the focal point may be manually assigned based on the object type or may be learned for different types of objects using an external tracking system. For these types of objects, the focal point may be biased towards the point of interaction. For example, for a computer monitor, the focal point may correspond to a center of the screen, neglecting the stand. For a bicycle, the focal point may be biased from the center mass towards a point closer to the handlebars. For a piano, the focal point may be biased from the center of mass towards a point closer to the keys. For a door, the focal point may be biased from the center of mass towards a point closer to the handle/push plate.

In an embodiment, the focal point of an object may change with distance. For example, from a far distance, people will be likely to point at the center of the object, regardless of the object's purpose. Thus, in an embodiment, the center of mass of an object may be used as the focal point when the object is greater than a predefined distance away. However, when closer to the object, people may tend towards the point of interaction on functional objects, but continue to point at the center of mass for simpler objects. Thus, in an embodiment, a pre-assigned focal point based on the object type may be used when the object is closer than the predefined distance. Each time an object is selected, the calibration module 412 may determine the difference between the direction of the focal point of the object and the actual pointing direction of the pointing controller 120 at the instant the object is selected. If these differences (and in particular, the yaw component) are consistently biased in one direction, the calibration module 412 may detect a miscalibration. In an embodiment, the miscalibration is only detected once a sufficient confidence level is reached such as, for example, after the yaw component of a number of object selections have been consistently biased in one direction. Upon detecting a miscalibration, the calibration module 412 can adjust the calibration parameter to correct the miscalibration. This re-calibration may be performed instantaneously or gradually applied over several seconds (to prevent the user seeing any "jumps").

Figure 5:
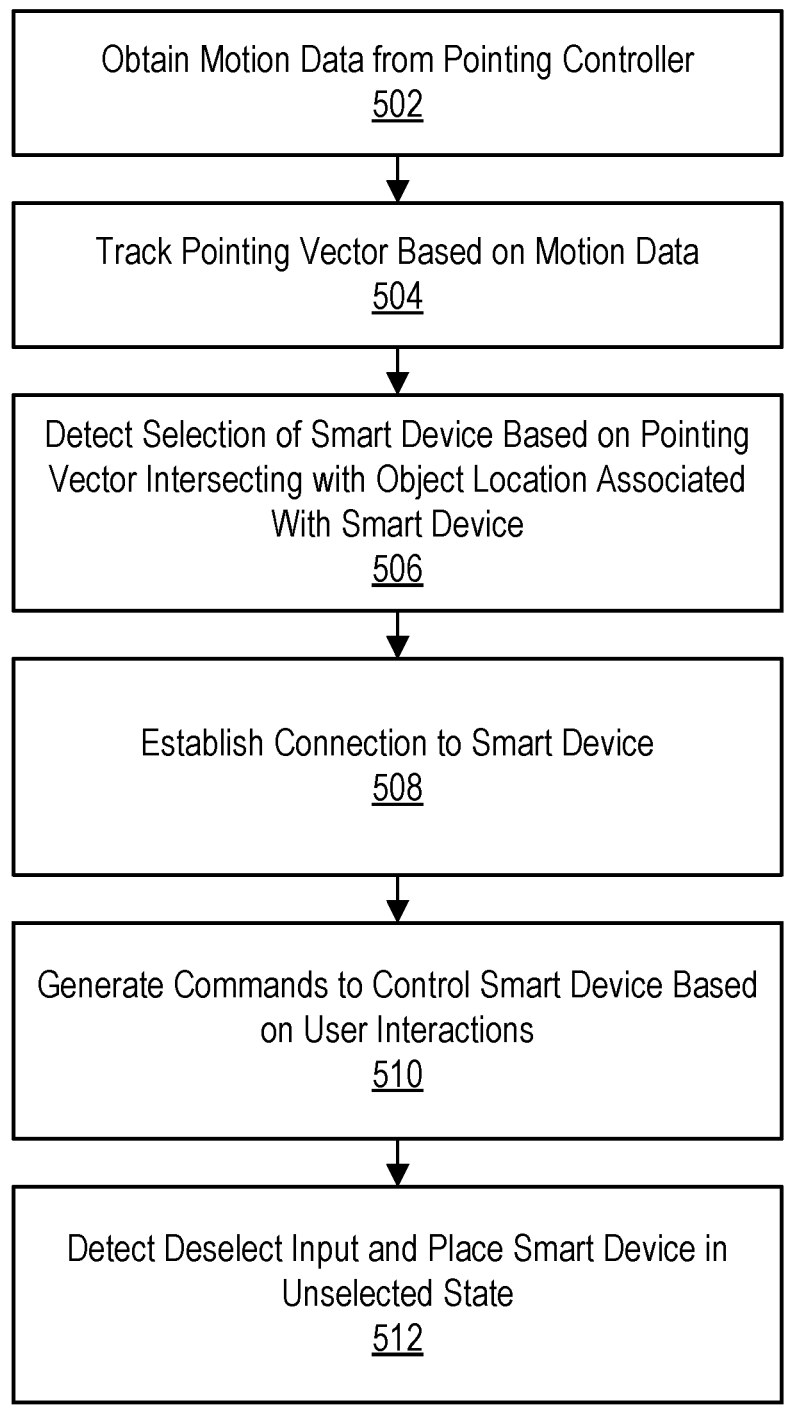
FIG. 5 illustrates an example embodiment of a process for controlling a smart device based on interactions using a pointing controller.

FIG. 5 is a flowchart illustrating an example embodiment of a process controlling a smart device 140 using a pointing controller 120. A tracking device 110 obtains 502 tracking data associated with position and orientation of a pointing controller 120. The tracking data may include motion data from which position can be derived, and may be in the form of IMU data, image data, RF beacon data, or a combination thereof. The tracking device 110 tracks 504 a pointing vector associated with a pointing direction of a user wearing the pointing controller 120 based on the tracking data. The pointing vector may comprise a line or cone that widens with distance from the pointing controller 120 along an axis of the pointing direction. The tracking device 110 detects 506 a selection of the smart device 140 based on detecting an intersection of the tracked pointing vector with an object location associated with the smart device 140 and places the smart device 140 into a selected state. Here, the object location may be a location of the smart device 140 itself, or may be a location of a real world or virtual proxy object associated with the smart device 140. In an embodiment, the tracking device 110 confirms the selection in response to detecting a predefined interaction (e.g., a gesture or selection of an interface control on the pointing controller) when the pointing direction intersects the object location. Upon selection of the smart device 140, the tracking device 110 establishes 508 a connection to the smart device 140 to enable it to communicate commands to the smart device 140 and/or receive status information from the smart device 140. The tracking device 140 generates 510 commands to control the smart device 140 based on detected user interactions. For example, the tracking device 110 detects one or more interactions performed using the pointing controller (e.g., a predefined gesture or interaction with an interface control) and determines a mapping of the interaction to a control command associated with the smart device 140. The tracking device may subsequently detect 512 an interaction associated with the pointing controller 120 for deselecting the smart device 140 and return the smart device 140 to an unselected state. For example, the tracking device 110 may deselect the smart device 140 in response to detecting the user pointing in a direction away from the direction of the object location associated with the smart device 140 or performing a different predefined gesture associated with deselecting the smart device 140.

In alternative embodiments, one or more components of the control processing module 324 may be implemented on the pointing controller 120 instead of on the tracking device 110. For example, in an embodiment, the functions of the tracking module 402 and gesture recognition module 406 may instead be performed by the pointing controller 120. In this embodiment, the tracking results and the detected gestures may be communicated directly to the tracking device 110 instead of communicating the raw tracking and control element data. Alternatively, in other embodiments, one or more components of the control processing module 324 may be implemented on a separate communicatively coupled device. For example, a mobile device, personal computer, or game console may receive raw tracking and control element data from the pointing controller 120, perform the functions of the control processing module 324 to process the raw data, and send processed control information to a tracking device 110 to cause the tracking device 110 to update the display on the display device 352. In yet another embodiment, one or more components of the control processing module 324 may be performed on a remote server (e.g., a cloud server) communicatively coupled to the pointing controller 120 and the tracking device 110.

In yet other embodiments, the tracking device 110 is omitted and the pointing controller 120 determines which smart device 140 or proxy device the user intends to interact with by using modulated infrared (IR) signals. Here, a transmitter located in the pointing controller 120 transmits modulated signals in a direction approximately aligned with the fingers and with a beam angle sufficiently narrow to enable precise targeting. The signals are received and demodulated by the smart device 140, a proxy device, or a beacon device attached to the smart device 140 or proxy device. The receiving device may then signal back to the pointing controller 120 through the network 130 or by re-transmitting a new IR signal. Alternatively, a transmitter located in the smart device 140 (or proxy device or attached beacon device) transmits signals that are received and demodulated by a directionally-sensitive sensor located in the pointing controller 120. Once the target device has been identified and selected, the generated commands 510 can be sent to the smart device 140 through the network 130. In some embodiments, commands may alternatively be communicated directly over the IR channel.

In the case of an IR-based solution, the transmitted beam or receiver optics will normally be narrow enough to select one object. In the case where multiple objects are illuminated, the tracking device 110 can attempt to disambiguate by looking at IR illumination strength, or duration of illumination. If disambiguation is not possible at the sensing level, the tracking device 110 may provide feedback to the user (by indicating that the pointing was ambiguous through optical, auditory or haptic feedback), thereby allowing them to point unambiguously at the intended target object.

In yet further embodiment, an external camera, depth-finding, or range-finding system may be located in a ceiling or wall-mounted module and may be utilized to track the pointing controller 120 or directly perform pose estimation and hand tracking without the use of a pointing controller 120.

Additional Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope.

The invention claimed is:

1. A method for controlling interactions with a smart device using a pointing controller, the method comprising:
   capturing image data of an object within an environment by a camera of a tracking device;
   detecting, from the image data, a location of the object within the environment;
   directing, via a user interface of the tracking device, a user to point to the object using the pointing controller;
   obtaining inertial sensor data from a state sensing device of the pointing controller;
   detecting, based on the inertial sensor data of the state sensing device of the pointing controller, when a pitch of the pointing controller matches a pitch vector between the tracking device and the location of the object and when the pointing controller is still;
   upon detecting from the inertial sensor data that the pitch of the pointing controller matches the pitch vector between the tracking device and the location of the object and that the pointing controller is still, performing a yaw calibration of the pointing controller to initialize a reference yaw of the pointing controller relative to yaw of the camera of the tracking device;
   tracking, based on the inertial sensor data, changes in yaw of the pointing controller relative to the reference yaw and tracking changes in roll and pitch relative to a detected direction of gravity;

tracking movement of a pointing vector through a three-dimensional space based on the changes in yaw, roll, and pitch and a stored arm model;
detecting, based on the movement, an intersection of the pointing vector with coordinates in the three-dimensional space associated with the smart device to place the smart device in a selected state;
causing an augmented reality display device to display a virtual menu associated with the smart device;
detecting a control interaction with the pointing controller associated with the virtual menu when the smart device is in the selected state; and
generating a command to control an operation of the smart device based on the control interaction.

2. The method of claim 1, wherein the coordinates associated with the smart device comprise a physical location of the smart device.

3. The method of claim 1 wherein the coordinates associated with the smart device comprise a location of a real or virtual proxy device associated with the smart device.

4. The method of claim 1, wherein detecting the intersection comprises:
generating a pointing cone having a central axis aligned with the pointing vector, an origin proximate to a location of the pointing controller, and a radius that increases with distance from the origin of the pointing vector; and
detecting the intersection with the pointing vector responsive to the pointing cone overlapping with the coordinates associated with the smart device.

5. The method of claim 1, wherein detecting the control interaction comprises detecting activation of an interdigit button of the pointing controller.

6. The method of claim 1, wherein detecting the control interaction comprises:
detecting interaction with a slider control interface of the pointing controller;
navigating between different menu items in the virtual menu responsive to the interaction with the slider control interface; and
selecting a menu item responsive to detecting of an activation of an interdigit button of the pointing controller.

7. The method of claim 1, wherein detecting the control interaction comprises:
detecting a gesture made with the pointing controller indicative of a control function of the smart device.

8. The method of claim 1, wherein tracking the movement of the pointing vector comprises performing tracking based on a camera integrated with the pointing controller.

9. The method of claim 1, further comprising:
recognizing the smart device as a smart light;
wherein detecting the control interaction with the pointing controller comprises detecting a swiping gesture on a touch interface of the pointing controller; and
wherein generating the command comprises controlling a dimming of the smart light dependent on a direction of the swiping gesture.

10. A non-transitory computer-readable storage medium storing instructions for controlling interactions with a smart device using a pointing controller, the instructions when executed by one or more processors causing the one or more processors to perform steps including:
capturing image data of an object within an environment by a camera of a tracking device;
detecting, from the image data, a location of the object within the environment;
directing, via a user interface of the tracking device, a user to point to the object using the pointing controller;
obtaining inertial sensor data from a state sensing device of the pointing controller;
detecting, based on the inertial sensor data of the state sensing device of the pointing controller, when a pitch of the pointing controller matches a pitch vector between the tracking device and the location of the object and when the pointing controller is still;
upon detecting from the inertial sensor data that the pitch of the pointing controller matches the pitch vector between the tracking device and the location of the object and that the pointing controller is still, performing a yaw calibration of the pointing controller to initialize a reference yaw of the pointing controller relative to yaw of the camera of the tracking device;
tracking, based on the inertial sensor data, changes in yaw of the pointing controller relative to the reference yaw and tracking changes in roll and pitch relative to a detected direction of gravity;
tracking movement of a pointing vector through a three-dimensional space based on the changes in yaw, roll, and pitch and a stored arm model;
detecting, based on the movement, an intersection of the pointing vector with coordinates in the three-dimensional space associated with the smart device to place the smart device in a selected state;
causing an augmented reality display device to display a virtual menu associated with the smart device;
detecting a control interaction with the pointing controller associated with the virtual menu when the smart device is in the selected state; and
generating a command to control an operation of the smart device based on the control interaction.

11. The non-transitory computer-readable storage medium of claim 10, wherein the coordinates associated with the smart device comprise a physical location of the smart device.

12. The non-transitory computer-readable storage medium of claim 10, wherein the coordinates associated with the smart device comprise a location of a real or virtual proxy device associated with the smart device.

13. The non-transitory computer-readable storage medium of claim 10, wherein detecting the intersection comprises:
generating a pointing cone having a central axis aligned with the pointing vector, an origin proximate to a location of the pointing controller, and a radius that increases with distance from the origin of the pointing vector; and
detecting the intersection with the pointing vector responsive to the pointing cone overlapping with the coordinates associated with the smart device.

14. The non-transitory computer-readable storage medium of claim 10, wherein detecting the control interaction comprises detecting activation of an interdigit button of the pointing controller.

15. The non-transitory computer-readable storage medium of claim 10, wherein detecting the control interaction comprises:
detecting interaction with a slider control interface of the pointing controller;
navigating between different menu items in the virtual menu responsive to the interaction with the slider control interface; and selecting a menu item responsive to detecting of an activation of an interdigit button of the pointing controller.

16. The non-transitory computer-readable storage medium of claim 10, wherein detecting the control interaction comprises:
  detecting a gesture made with the pointing controller indicative of a control function of the smart device.

17. The non-transitory computer-readable storage medium of claim 10, wherein tracking the movement of the pointing vector comprises performing tracking based on a camera integrated with the pointing controller.

18. The non-transitory computer-readable storage medium of claim 10, further comprising:
  recognizing the smart device as a smart light;
  wherein detecting the control interaction with the pointing controller comprises detecting a swiping gesture on a touch interface of the pointing controller; and
  wherein generating the command comprises controlling a dimming of the smart light dependent on a direction of the swiping gesture.

19. A tracking device comprising:
one or more processors; and
a non-transitory computer-readable storage medium storing instructions for controlling interactions with a smart device using a pointing controller, the instructions when executed by the one or more processors causing the one or more processors to perform steps comprising:
  capturing image data of an object within an environment by a camera of a tracking device;
  detecting, from the image data, a location of the object within the environment;
  directing, via a user interface of the tracking device, a user to point to the object using the pointing controller;
  obtaining inertial sensor data from a state sensing device of the pointing controller;
  detecting, based on the inertial sensor data of the state sensing device of the pointing controller, when a pitch of the pointing controller matches a pitch vector between the tracking device and the location of the object and when the pointing controller is still;
  upon detecting from the inertial sensor data that the pitch of the pointing controller matches the pitch vector between the tracking device and the location of the object and that the pointing controller is still, performing a yaw calibration of the pointing controller to initialize a reference yaw of the pointing controller relative to yaw of the camera of the tracking device; tracking, based on the inertial sensor data, changes in yaw of the pointing controller relative to the reference yaw and tracking changes in roll and pitch relative to a detected direction of gravity;
  tracking movement of a pointing vector through a three-dimensional space based on the changes in yaw, roll, and pitch and a stored arm model;
  detecting, based on the movement, an intersection of the pointing vector with coordinates in the three-dimensional space associated with the smart device to place the smart device in a selected state;
  causing an augmented reality display device to display a virtual menu associated with the smart device;
  detecting a control interaction with the pointing controller associated with the virtual menu when the smart device is in the selected state; and
  generating a command to control an operation of the smart device based on the control interaction.

20. The tracking device of claim 19, wherein the coordinates associated with the smart device comprise a physical location of the smart device.

* * * * *